United States Patent
Bourke et al.

(10) Patent No.: US 6,926,154 B2
(45) Date of Patent: Aug. 9, 2005

(54) FLOTATION MACHINE

(75) Inventors: Peter Bourke, Perth (AU); David Taylor, Gordon (AU)

(73) Assignee: Outokumpu Oyj, Espoo (FI)

(*) Notice: Subject to any disclaimer, the term of this patent is extended or adjusted under 35 U.S.C. 154(b) by 0 days.

(21) Appl. No.: 10/451,199

(22) PCT Filed: Dec. 11, 2001

(86) PCT No.: PCT/FI01/01079
§ 371 (c)(1),
(2), (4) Date: Dec. 18, 2003

(87) PCT Pub. No.: WO02/49768
PCT Pub. Date: Jun. 27, 2002

(65) Prior Publication Data
US 2004/0084354 A1 May 6, 2004

(30) Foreign Application Priority Data
Dec. 20, 2000 (FI) .............................................. 20002801

(51) Int. Cl.[7] .............................. B03D 1/14; B03D 1/16
(52) U.S. Cl. ........................................ 209/168; 209/169
(58) Field of Search ................................ 209/168, 169, 209/170

(56) References Cited

U.S. PATENT DOCUMENTS

| 1,309,219 | A | * | 7/1919 | Ruth, Jr. ...................... 209/169 |
| 2,064,398 | A | * | 12/1936 | Zeigler ........................ 209/169 |
| 2,416,006 | A | | 2/1947 | Phelps ......................... 209/168 |
| 2,525,430 | A | * | 10/1950 | Smith ........................... 127/69 |
| 3,828,935 | A | * | 8/1974 | Rovel ........................... 210/523 |
| 4,659,458 | A | | 4/1987 | Chin et al. ................... 209/164 |
| 6,083,389 | A | | 7/2000 | Suša ........................... 210/221.2 |

* cited by examiner

Primary Examiner—Thomas M. Lithgow
(74) Attorney, Agent, or Firm—Morgan & Finnegan, LLP

(57) ABSTRACT

The invention relates to a flotation machine which at least contains a flotation cell having a means for feeding slurry in the flotation cell, a means for feeding air into the slurry and producing froth, a means for removing froth from the flotation cell and a means for removing tailings from the flotation cell. According to the invention the flotation cell (1,21) is provided with at least one rotating froth removal device (8,26) immersed at least partly in the froth (9,27) and so shaped that one end of the froth removal device (8,26) is extendible over the launder (12) attached to the flotation cell (1) in order to recover the froth (9,27) from the flotation cell (1,21) using the centrifugal force generated by the froth removal device (8,26).

8 Claims, 2 Drawing Sheets

FLOTATION MACHINE

Figure 1:
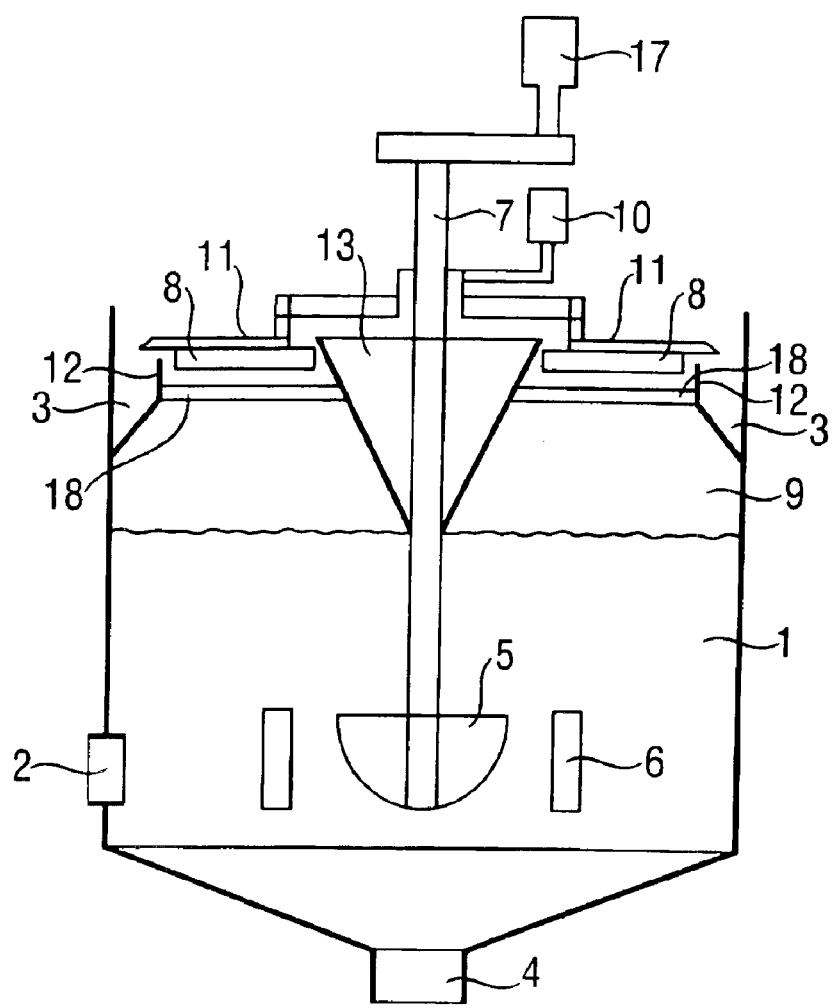

The invention relates to a froth flotation machine to be used in flotation of slurry for separation valuable components from tailings, in which machine a device is installed in the upper part of the cell froth zone so that at least one part of the rotating device is partly immersed into the froth in order to improve the removal of froth from the flotation machine.

A froth flotation machine for recovering valuable mineral particles normally comprises a flotation cell in the form of a tank having an inlet in the cell wall for feeding slurry to be flotated as well as an outlet for tailings in the lower part of the cell. Air for generating a froth is fed through a hollow and rotatable shaft which is connected to an agitator that mixes the slurry to keep it in suspension. As the agitator rotates air is fed into the slurry and bubbles are dispersed. Suitable reagents are also added to the process which reagents are capable of coating the surfaces of valuable mineral particles to make their surfaces hydrophobic and so promote bubble/particle attachment. Once the valuable mineral particles attach to an air bubble they slowly rise to the cell surface to form a stable froth zone. This froth layer is mobile and travels across the cell surface and is collected into a concentrate launder which often surrounds the upper part of the flotation cell. When the cell size is increased the distance between the centre part of the flotation cell and the concentrate launder will also increase. This means that the removal of froth from the flotation cell is not very effective since a longer transport distance means that the probability of bubble coalescence and particle drop back will increase. Therefore, different devices are installed in the flotation cell for effecting the removal of froth.

The U.S. Pat. No. 5,039,400 describes a regulating member for froth created in a flotation machine. This regulating member is a cone which top is immersed in the froth. Thus the free area of froth is upwards decreased and the froth is obliged to go closer and closer to the wall of the flotation cell and thus closer to the concentrate launder surrounding the upper part of the flotation cell.

The U.S. Pat. No. 4,913,805 relates to an apparatus and method for froth flotation separation of the components of a slurry, having particular utility for the beneficiation of coal. In this arrangement a spray nozzle is positioned above a flotation tank and the spraying operation creates a froth on the water surface. For the removal of the froth containing a substantial quantity of coal particles a continuously operating skimming arrangement having ridges or ribs skims the froth from the water surface as a cleaned or beneficiated product.

The skimming arrangement as described in the U.S. Pat. No. 4,913,805 is practical in a flotation tank which has a launder for froth only on that area where the skimming arrangement moves froth from the centre part of the concentrate tank towards that part of the lip which is provided with the launder.

The regulating member of the U.S. Pat. No. 5,039,400 decreases the distance from the centre part of the flotation cell to the lip of the flotation cell. Further, the regulating member can be used with a concentrate launder surrounding the flotation cell and thus froth can be removed from the flotation cell freely independent on the directions towards the concentrate lip of the flotation cell. While this regulating member is effective for reducing froth transport distance it becomes less effective as the cell size increases above 50 cubic meters. The nett active volume of the flotation cell is also significantly reduced by the regulating member as the cell size increases.

The object of the present invention is to eliminate some drawbacks of the prior art and to achieve a device for effecting the removal of froth from the free area in the upper part of a flotation machine. The essential features of the invention are enlisted in the appended claims.

According to the invention at least one device for improving the removal of froth essentially from the whole free area of froth is installed in the upper part of a flotation machine which at least contains a flotation cell having a means for feeding slurry in the flotation cell, a means for producing froth, a means for removing froth from the flotation cell and a means for removing tailings from the flotation cell. The device for improving the removal of froth is installed so that the device is partly immersed below the surface of froth. The froth removal device is operated by a drive mechanism, and when the froth removal device is in operation, the froth produced onto the surface of the flotation cell is removed from the cell without the need for the froth concentrate to travel horizontally to be recovered to a launder having a connection with a lip of the flotation cell. This is because the froth removal device is shaped so that when operating the device will remove the froth at a predetermined height.

The froth removal device of the invention has a cutting face which is partly immersed below the surface of the froth at a predetermined height. The cutting face will cut the froth surface in an inclined or horizontal position to the froth surface so that at least most of the froth bubbles within the froth zone are not broken or caused to collapse. The bubbles contain on their surface the valuable components which will form at least one portion of a froth concentrate recovered from the flotation cell. The bubbles cut from the froth will slide along the surface of the froth removal device into a froth removal member of the device connecting to the cutting face. The froth removal member is installed so that the lower surface of the froth removal device is essentially at the same level as the upper part of the lip between the launder and the froth zone. This means that the centrifugal force generated as the froth removal device rotates forces the froth up the inclined cutting face. Once the froth reaches the lower surface of the rotating froth removal member the bubbles in the froth at least partly are deaerated and thus broken back to a slurry and the slurry will flow in the froth removal member towards the lip of the flotation cell and further into the launder surrounding the flotation cell.

When using the froth removal device of the invention it is advantageous to provide the flotation cell with froth stabilising members. The froth stabilising members are located within an essentially even distance from each other so that plural froth stabilising members are operated in the essentially whole free froth area of the flotation cell. The number of the froth stabilising members is advantageously at least eight and the froth stabilising members are installed in the froth zone close to the froth removal device in order to prevent a possible froth collapse during the movement of the froth removal device. This froth collapse is caused by a slight vacuum behind the froth removal device when the froth removal device moves across the froth surface.

By using the froth removal device of the invention the amount of the particle drop back into the pulp phase is essentially reduced and thereby the recovery of valuable components is increased overall and at a much faster rate than in the prior art. Further, the froth removal device of the invention will allow the amount of the lip length required in a flotation cell to be varied by changing both the number of the devices and the operating speed compared with the lip. Hence, it is also to control the rate of removal of the froth concentrate and thereby its grade.

The froth removal device of the invention will help to improve especially the recovery of coarse particles from a flotation cell because the froth removal device will limit the time a coarse particle needs to spend in the froth phase before being removed to the launder. The froth removal device will eliminate the need for complicated internal launders and will also reduce the amount of crowding of the froth free area required.

Because the froth removal device will at least partly deaerate the recovered froth concentrate the size of a perimeter launder will be decreased. Also subsequent piping is to be substantially decreased in size without limiting the performance.

The invention is described in more details in the following drawings where

Figure 2:
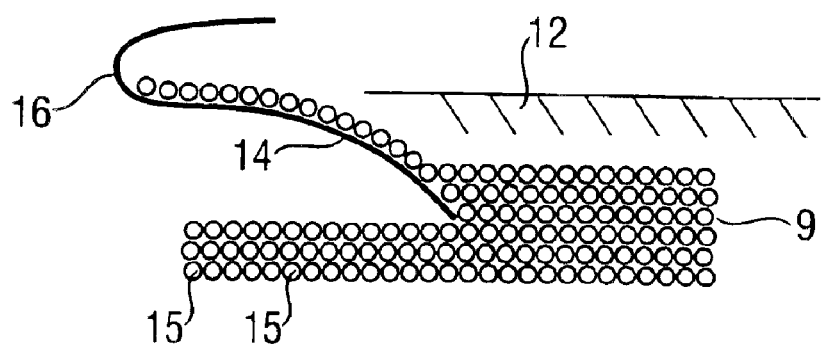
Figure 3:
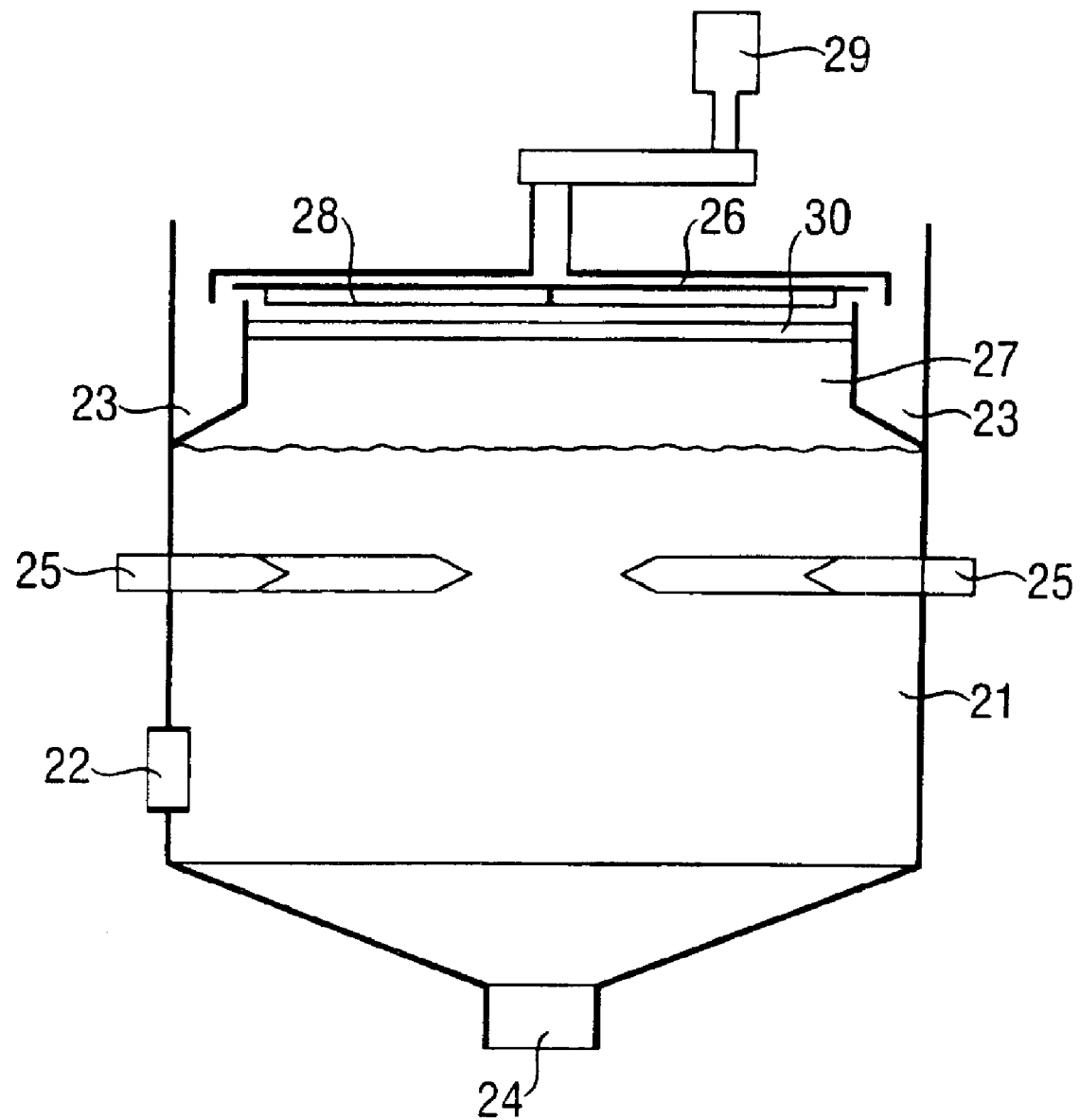

FIG. 1 shows one advantageous embodiment of the invention as a schematical and partial cross-sectional side view, FIG. 2 shows a section A—A of the embodiment FIG. 1 schematically as an enlarged view, and FIG. 3 shows another advantageous embodiment of the invention as a schematical and partial cross-sectional side view.

In FIG. 1 a flotation cell 1 has in the wall an opening 2 for slurry to be flotated as well as a launder 3 for froth concentrate produced in the cell 1 is attached to the wall. The flotation cell 1 has in the bottom part an opening 4 for tailings. The flotation cell 1 has also in its lower part a rotor 5 surrounded by a stator 6. The rotor 5 is attached to an axis 7 which is rotated by a motor 17. The axis 7 is hollow and air for froth flotation is fed through the hollow axis 7 to the rotor 5. The froth removal device 8 is installed coaxially but separately with the axis 7 in the upper part of the flotation cell 1 in the height where the froth removal device 8 is at least partly immersed in the froth 9 produced in the flotation cell 1. Froth stabilising members 18 are installed in the froth 9 below the froth removal device 8 radially from a froth regulating member 13 towards the wall of the flotation cell 1.

The froth removal device 8 is operated by a drive mechanism 10. The end 11 of the froth removal device 8 separated from the axis 7 is shaped so that the end 11 of the froth removal device 8 will extend over the lip 12 between the launder 3 and the froth zone in the flotation cell 1. In the flotation cell 1 a froth regulating member 13 is surrounding the axis 7. The froth removal device 8 is installed so that essentially the whole free froth area is accessible for the froth removal device 8 when operated.

FIG. 2 shows the froth removal device 8 in more details. The cutting face 14 is at least partly immersed in the froth 9 containing bubbles 15 to be removed. The cutting face 14 is in an inclined position to the bubbles 15 so that at least most of the bubbles 15 are unbroken when removed from the froth 9 to the surface of the cutting face 14 and further to the lower surface of the froth removal member 16 of the froth removal device 8. The froth removal member 16 is so installed that the lower surface of the froth removal member receiving the froth is essentially at the level as the lip 12 between the launder 3 and the froth zone in the flotation cell 1. In the froth removal member 16 of the froth removal device 8 the bubbles 15 are deaerated and thus broken. Froth as liquid form flows towards the launder 3 and thus out of the flotation cell 1.

The embodiment of the FIGS. 1 and 2 will be operated so the froth removal device 8 is rotated coaxially with the axis 7 by the drive mechanism 10. When rotating the centrifugal force will pump the deaerated froth in the froth removal device 8 towards the launder 3 and thus out of the flotation cell 1.

In FIG. 3 a flotation cell 21 is provided with an inlet 22 for slurry and a launder 23 for froth and an outlet 24 for tailings. There is also a means 25 for supplying air into the flotation cell 21. A froth removal device 26 is installed on the froth zone 27 so that a cutting face 28 of the froth removal device 26 is partly immersed into the froth 27. The froth removal device 26 is rotated by a drive mechanism 29. Further, froth stabilising members 30 are installed below the cutting face 28 into the froth zone 27. The operation and the structure of the froth removal device 26 is similar to the froth removal device of the embodiment in FIG. 1. This means that when rotating the centrifugal force will pump the deaerated froth in the froth removal device 26 towards the launder 23 and thus out of the flotation cell 21.

What is claimed is:

1. Flotation machine comprising:

a flotation cell having a means for feeding slurry in the flotation cell, a means for feeding air into the slurry and producing froth, a means for removing froth from the flotation cell, a means for removing tailings from the flotation cell, means for preventing a possible froth collapse during movement of the froth removal device consisting essentially of at least eight evenly spaced, radially oriented stabilizing members; and at least one rotating froth removal device, which is capable of being at least partly immersed in the froth, the froth removal device having a portion that extends over a launder, capable of carrying froth into the launder, the froth removal device being attached to the flotation cell, for recovery of froth, the froth removal device capable of generating centrifugal force, that causes froth to travel from the flotation cell, along a face of the froth removal device, to the launder, and at least eight froth stabilizing members for preventing a possible froth collapse during movement of the froth removal device.

2. Flotation machine according to claim 1, wherein the froth removal device is provided with a cutting face partly immersed in the froth.

3. Flotation machine according to claim 1, wherein the froth removal device is provided with a cutting face installed in an inclined position relative to an upper surface of the froth.

4. Flotation machine according to the claim 1, wherein the froth removal device is provided with a cutting face installed in a horizontal position relative to an upper surface of the froth.

5. Flotation machine according to claim 1, wherein the froth removal device is provided with a froth removal member in order to remove material attached to the froth from the flotation cell.

6. Flotation machine according to claim 1, wherein the froth removal device is installed coaxially with a slurry rotating member.

7. Flotation machine according to claim 1, wherein the froth removal device is operated with a drive mechanism separated from a motor rotating the slurry rotating member.

8. Flotation machine according to claim 1, wherein the froth removal device operates over substantially a whole free froth area of the flotation cell.

* * * * *